United States Patent
Lorenz et al.

(10) Patent No.: US 10,290,102 B2
(45) Date of Patent: May 14, 2019

(54) IMAGE QUALITY DRIVEN NON-RIGID IMAGE REGISTRATION

(71) Applicant: KONINKLIJKE PHILIPS N.V., Eindhoven (NL)

(72) Inventors: Cristian Lorenz, Hamburg (DE); Sven Kabus, Hamburg (DE); Tobias Klinder, Uelzen (DE); Jens Von Berg, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 218 days.

(21) Appl. No.: 14/405,007

(22) PCT Filed: Jun. 18, 2013

(86) PCT No.: PCT/IB2013/054978
§ 371 (c)(1),
(2) Date: Dec. 2, 2014

(87) PCT Pub. No.: WO2014/001959
PCT Pub. Date: Jan. 3, 2014

(65) Prior Publication Data
US 2015/0161791 A1 Jun. 11, 2015

Related U.S. Application Data

(60) Provisional application No. 61/664,913, filed on Jun. 27, 2012.

(51) Int. Cl.
*G06T 7/33* (2017.01)
*G06T 7/00* (2017.01)
(Continued)

(52) U.S. Cl.
CPC ............ *G06T 7/0014* (2013.01); *G06K 9/46* (2013.01); *G06T 3/0068* (2013.01); *G06T 7/20* (2013.01); *G06T 7/344* (2017.01); *G06T 17/10* (2013.01)

(58) Field of Classification Search
CPC ....... G06T 7/0024; G06T 7/0012; G06T 7/33; G06T 2207/30004; G06T 2207/10072;
(Continued)

(56) References Cited

U.S. PATENT DOCUMENTS 7,822,291 B2 * 10/2010 Guetter ................ G06K 9/6206
382/128
7,945,117 B2 * 5/2011 Hermosillo Valadez ....................
G06K 9/6206
382/128
(Continued)

FOREIGN PATENT DOCUMENTS

WO WO-2010086776 A1 * 8/2010 ........... A61B 6/5235
WO 2014001946 A1 1/2014

OTHER PUBLICATIONS

Zhou et al., Robust Non-Rigid Registration of Medical Images with Incomplete Image Information Using Local Structure-Adaptive Block Matching Method, Nov. 28, 2007 [retrieved Nov. 9, 2016], Proc SPIE: Electronic Imaging and Multimedia Tech, vol. 6833, 11 total pages. Retrived Internet: http://proceedings.spiedigitallibrary.org/proceeding.aspx?articleid=815223.*
(Continued)

*Primary Examiner* — Matthew C Bella
*Assistant Examiner* — Dennis Rosario (57) ABSTRACT

An image registration apparatus (118) includes an image quality driven image registration determiner (202) that determines an image quality driven image registration for a set of images to register based on a non-rigid registration (204), which includes an optimization of an image similarity
(Continued)

term and a regularization term, and a registration steering factor, and a registration component (206) that registers the set of images using the image quality driven image registration. A method determining an image quality driven image registration for a set of images to register based on a non-rigid registration, which includes an optimization of an image similarity term and a regularization term, and a registration steering factor, and registering the set of images using the fidelity driven image registration, generating a set of registered images.

15 Claims, 4 Drawing Sheets

(51) Int. Cl.
*G06T 3/00* (2006.01)
*G06K 9/46* (2006.01)
*G06T 7/20* (2017.01)
*G06T 17/10* (2006.01)

(58) Field of Classification Search
CPC .......... G06T 2207/10088; G06T 7/11; G06T 3/0068; G06T 7/30; G06T 2207/10081; G06T 7/12; G06T 7/149; G06T 7/251; G06T 7/344; A61B 6/032; A61B 5/055; A61B 6/037; A61B 6/5247
See application file for complete search history.

(56) References Cited

U.S. PATENT DOCUMENTS

| | | | |
|---|---|---|---|
| 8,805,122 B1* | 8/2014 | Periaswamy | G06T 3/4007 382/128 |
| 9,033,887 B2* | 5/2015 | Ionasec | A61B 8/065 600/441 |
| 9,129,424 B2* | 9/2015 | Xue | G06T 11/003 |
| 2006/0002632 A1 | 1/2006 | Fu et al. | |
| 2008/0123927 A1 | 5/2008 | Miga et al. | |
| 2015/0139503 A1* | 5/2015 | Kabus | G06T 7/0016 382/107 |

OTHER PUBLICATIONS

Suarez et al., Lecture Notes in Computer Science: Nonrigid Registration Using Regularized Matching Weighted by Local Structure, Oct. 10, 2002 [retrieved Nov. 9, 2016], International Conference on Medical Image Computing and Computer-Assisted Intervention 2002, vol. 2489, pp. 581-589. Retrive Internet: http://link.springer.com/chapter/10.1007/3-540-45787-9_73.*
Tang et al., Reliability-Driven, Spatially-Adaptive Regularization for Deformable Registration, 2010 [retrieved Nov. 16, 2017], Medical Image Computing and Computer-Assisted Intervention Workshop on Medical Computer Vision (MICCAI MCV), vol. 6533,pp. 1-12. Retrieved from the Internet: http://www.cs.sfu.ca/~hamarneh/bib/year/2010.html.*
Guetter et al., Learning Based Non-rigid Multi-modal Image Registration Using Kullback-Leibler Divergence, 2005 [retrieved Nov. 16, 2017], Medical Image Computing and Computer-Assisted Intervention—MICCAI 2005, Lecture Notes in Computer Science, vol. 3750,pp. 255-262. Ret Internet: https://rd.springer.com/chapter/10.1007%2F11566489_32?LI=true#citeas.*
Xue et al., Phase-sensitive inversion recovery for myocardial T1 mapping with motion correction and parametric fitting, Jun. 26, 2012 (retrieved Jan. 30, 2019), Magnetic Resonance in Medicine, vol. 69, Issue 5, pp. 1408-1420. Retrieved Internet: https://onlinelibrary.wiley.com/doi/full/10.1002/mrm.24385 (Year: 2012).*
Xue et al., Motion correction for myocardial T1 mapping using image registration with synthetic image estimation, Aug. 29, 2011 retrieved Jan. 30, 2019), Magnetic Resonance in Medicine, vol. 67,pp. 1644-1655. Retrieved Internet: https://onlinelibrary.wiley.com/doi/epdf/10.1002/mrm.23153 (Year: 2011).*
Nekolla et al., T1 Maps by K-Space Reduced Snapshot-FLASH MRI, 1992 (retrieved Jan. 30, 2019), Journal of Computer Assisted Tomography, vol. 16, No. 2,pp. 327-332. Retrieved USPTO database's U.S. Appl. No. 13/864,716 (now U.S. Pat. No. 9,129,424). (Year: 1992).*
Sass et al., Error Analysis for Optimized Inversion Recovery Spin-Lattice Relaxation Measurements, 1977 (retrieved Jan. 30, 2019), Journal of Magnetic Resonance, vol. 25,pp. 263-276. Retrieved USPTO database's U.S. Appl. No. 13/864,716 (now U.S. Pat. No. 9,129,424). (Year: 1977).*
Ettinger, G. J., et al.; Automatic 3D Image Registration for Medical change Detection Applications; 1994; Applications of Computer Vision in Medical Image Processing; pp. 182-185.
Kabus, S., et al.; Robust Lung Ventilation Assessment; Sep. 26, 2013; Med. Image Anal.; 12:752-763.
Kabus, S., et al.; Fast Elastic Image Registration; 2010; Medical Image analysis for the Clinic: A Grand Challenge; pp. 81-89.
Lucas, B. D., et al.; An Iterative Image Registration Technique with an Application to Stereo Vision; 1981; IJCAI; pp. 674-679.
Maintz, J. B. A., et al.; A Survey of medical Image Registration; 1998; Medical Image Analysis; 2(1)1-37.
Pluim, J. W. P., et al.; Image Registration by Maximum of Combined Mutual Information and Gradient Information; 2000; IEEE Trans. on Medical Imaging; 19(8)809-814.
Pluim, J. W. P., et al.; Mutual-Information-Based Registration of Medical Images: A Survey; 2003; IEEE Trans. on Medical Imaging; 22(8)986-1004.
Rodriguez-Carranza, C. E., et al.; A weighted and deterministic entropy measure for image registration using mutual information; SPIE Proceedings; vol. 3338:155-166.
Niranjan Damera-Venkata, "Image Quality Assessment Based on a Degradation Model", IEEE Transactions on Image Processing, vol. 9, No. 4, Apr. 2000.
Lucas, et al., "An Iterative Image Registration Technique with an Application to Stereo Vision", Proceedings of the International Joint Conference on Artificial Intelligence, Apr. 1981.
Xiangbo, et al., "Knowledge Based Image Segmentation Using Deformable Registration: Application to Brain MRI Images", Chinese Doctoral issertations Full-text Database (Information and Science Technology), No. 9, 2010, English Abstract only.
Cheng, et al., "A Method of Elastic Image Registration Based on New Energy Functional", The 14th National Image Graphics Academic Conference Proceedings, Mar. 23, 2009, English Abstract only.
Anonymous: "metric", In: "The IEEE Standard Dictionary of Electrical and Electronics Terms—Sixth Edition", Jan. 1, 1996, p. 651.

* cited by examiner

IMAGE QUALITY DRIVEN NON-RIGID IMAGE REGISTRATION

CROSS REFERENCE TO RELATED APPLICATIONS

This application is a national filing of PCT application Ser. No. PCT/IB2013/054978, filed Jun. 18, 2013, published as WO 2014/001959 Al on Jan. 3, 2014, which claims the benefit of U.S. provisional application Ser. No. 61/664,913 filed Jun. 27, 2012, which is incorporated herein by reference.

The following generally relates to a non-rigid (elastic) image registration that is steered by a registration steering factor, which is based on at least one of a known imaging system image quality or a determined image quality of at least one image of registered images, and is described with particular application to computed tomography (CT). However, the following is also amenable to other imaging modalities.

Image registration is the process of transforming one or more images into a coordinate system of a reference image. Two well-known transformation models include rigid (or affine) and non-rigid (or elastic) transformations. Rigid transformations, generally, are linear transformations, which include translation, rotation, and scaling transforms. In contrast, non-rigid transformations also locally warp an image to align the image with the reference image.

Non-rigid image registration is increasingly accepted as base technology to establishing correspondence between CT images. The application range is broad, covering frequent applications such as dynamic contrast imaging and change quantification in follow-up studies. However, non-rigid registration is typically based on an image similarity term, which is very susceptible to an imperfect image quality, being most prominently image artifacts, caused by, for example, motion, imperfect imaging, high contrast objects, etc.

Non-rigid image registration generally has included an iterative optimization of an objective function that includes the image similarity term (e.g., mutual information or sum of squared differences) and an additional regularization term, where the image similarity term is maximized, while the additional regularization term keeps the solution in some sense realistic (e.g., usually within a predetermined smoothness of the resulting deformation field).

Unfortunately, misleading image information, such as image artifacts, can cause errors in the registration result, which are difficult to detect in an automated fashion. Furthermore, the image similarity term cannot be used to detect the errors since the image similarity term is optimized during the registration. In view of the foregoing, there is an unresolved need for handling such misleading image information.

Aspects described herein address the above-referenced problems and others.

In one aspect, an image registration apparatus includes an image quality driven image registration determiner that determines an image quality driven image registration for a set of images to register based on a non-rigid registration, which includes an optimization of an image similarity term and a regularization term, and a registration steering factor, and a registration component that registers the set of images using the image quality driven image registration.

In another aspect, a method determining an image quality driven image registration for a set of images to register based on a non-rigid registration, which includes an optimization of an image similarity term and a regularization term, and a registration steering factor, and registering the set of images using the fidelity driven image registration, thereby generating a set of registered images.

In another aspect, a method includes improving a result of a non-rigid registration by making the non-rigid registration less sensitive to imperfect image information by employing a registration steering factor with the non-rigid registration, wherein the non-rigid registration includes an optimization of an image similarity term and a regularization term.

The invention may take form in various components and arrangements of components, and in various steps and arrangements of steps. The drawings are only for purposes of illustrating the preferred embodiments and are not to be construed as limiting the invention.

The following describes an image registration approach in which an image registration algorithm, which includes an optimization of an objective function having an image similarity term and a regularization term, is steered away from the image similarity term as a function of image quality, which is determined by at least one of a known imaging system image quality or a determined image quality of a previous registration. The registration can be used with images from imaging modalities such as MR, PET, SPECT, US, x-ray, and/or other imaging modalities; however, for explanatory purpose and sake of brevity, the following is described in connection with a CT imaging system and CT images.

Figure 1:
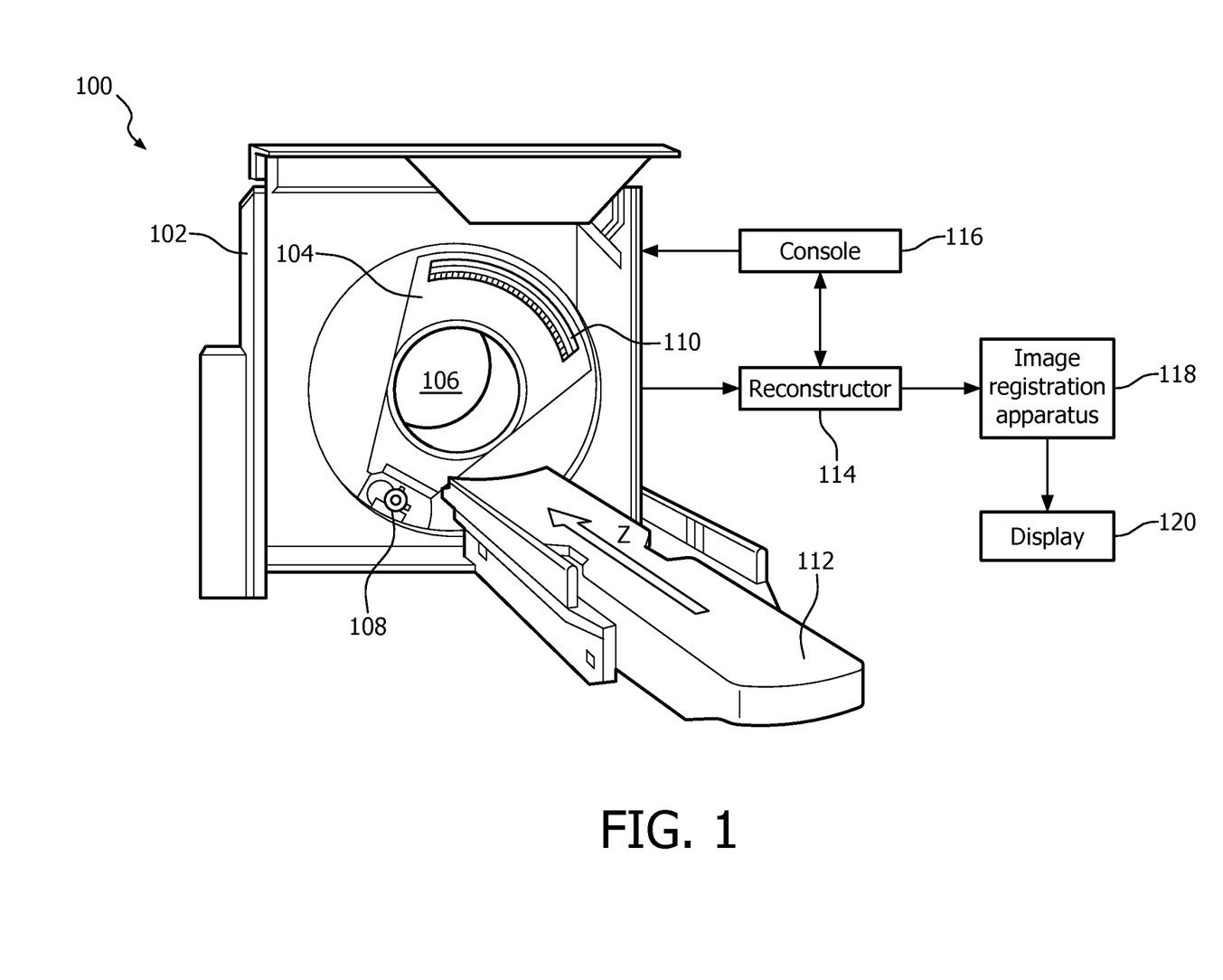
FIG. 1 schematically illustrates an imaging system in connection with a deformation vector field determiner image processing component configured to at least register images.

FIG. 1 schematically illustrates an imaging system 100 such as a CT scanner.

The imaging system 100 includes a generally stationary gantry 102 and a rotating gantry 104, which is rotatably supported by the stationary gantry 102 and rotates around an examination region 106 about a z-axis. A radiation source 108, such as an x-ray tube, is rotatably supported by the rotating gantry 104, rotates with the rotating gantry 104, and emits radiation that traverses the examination region 106. A radiation sensitive detector array 110 subtends an angular arc opposite the radiation source 108 across the examination region 106. The detector array 110 detects radiation traversing the examination region 106 and generates projection data indicative thereof for each detected photon.

The imaging system 100 can be used to acquire a 4D image set of a moving object. As utilized herein, a 4D image set includes 3D images of the moving object over the motion cycle of the moving object, which includes a full expansion phase, a full contraction phase, one or more phases between the full expansion and full contraction phases, and one or more phases between the full contraction and full expansion phases. A reconstructor 114 reconstructs the projection data, generating 3D and/or 4D image sets indicative of a scanned portion of a subject or object located in the imaging region 106.

A subject support 112, such as a couch, supports an object or subject in the examination region 106 before, during and/or after scanning. A general-purpose computing system or computer serves as an operator console 116. The console 116 includes a human readable output device such as a monitor and an input device such as a keyboard, mouse, etc. Software resident on the console 116 allows the operator to interact with and/or operate the scanner 100 via a user interface or otherwise. Such interaction includes selecting a scan protocol such as a 3D, a 4D or other imaging acquisition, initiating scanning, etc.

An image registration apparatus 118 at least registers images, for example, images of a 3D and/or 4D image set acquired by the imaging system 100 and/or other imaging system. The image registration apparatus 118 may also determine deformation vector fields (DVFS) between registered 4D images of the image set. Generally, the DVFs include mappings of a motion phase of a baseline image(s) onto the other images of the image set, thereby establishing a voxel-wise correspondence or mapping over a motion cycle of the moving object. The image registration apparatus 118 outputs at least one of registered images, the DVFS, and/or other information.

In one instance, the image registration apparatus 118 employs a non-rigid registration that includes an optimization of an image similarity term and a regularization term. As described in greater detail below, the image registration apparatus 118 steers the non-rigid registration away from the image similarity term (and/or towards the regularization term) based on at least one of a known imaging system image quality variation across images generated by the system or a determined image quality of a registered image, on a voxel or voxel region basis. Steering the registration as such allows for mitigating local registration errors due to a known imaging system image quality limitation(s) and/or misleading image information such as artifacts by down weighting the image similarity term contribution to the registration on a local region basis.

The image registration apparatus 118 can visually present at least one of registered images, the DVFs, and/or other information via a display 120. In one instance, the image registration apparatus 118 presents such data in a user interactive graphical user interface (GUI). Such a display may allow a user to input information affecting the registration and/or DVF determination. For example, an interactive display may allow the user to provide, select and/or change a particular algorithm that influences how the image registration apparatus 118 steers the non-rigid registration and/or what data is used to determine the steering, parameters of the algorithm, a decision threshold that influences the steering and/or whether a subsequent registration should be performed, etc.

The image registration apparatus 118 can also visually present notifications and/or recommendations for a user. For example, where the image registration apparatus 118 determines, based on the decision threshold, that an image quality of registered images satisfies the threshold, the image registration apparatus 118 can present a notification that the registration is acceptable. However, where the image registration apparatus 118 determines, based on the decision threshold, that an image quality of a voxel and/or region of voxels of one or more of the registered images does not satisfy the threshold, the image registration apparatus 118 can present a notification indicating so and/or a recommendation to perform another registration of the images, steering the registration way from the image similar term for the voxel and/or region of voxels.

It is to be appreciated that the image registration apparatus 118 can be a computing system such as a computer, which includes one or more processors executing one or more computer readable instructions encoded, embed, stored, etc. on computer readable storage medium such as physical memory and/or other non-transitory memory. Additionally or alternatively, at least one of the computer readable instructions in can be carried by a signal, carrier wave and/or other transitory medium. The computing system may also include a human readable output device such as a monitor and an input device such as a keyboard, mouse, etc.

Figure 2:
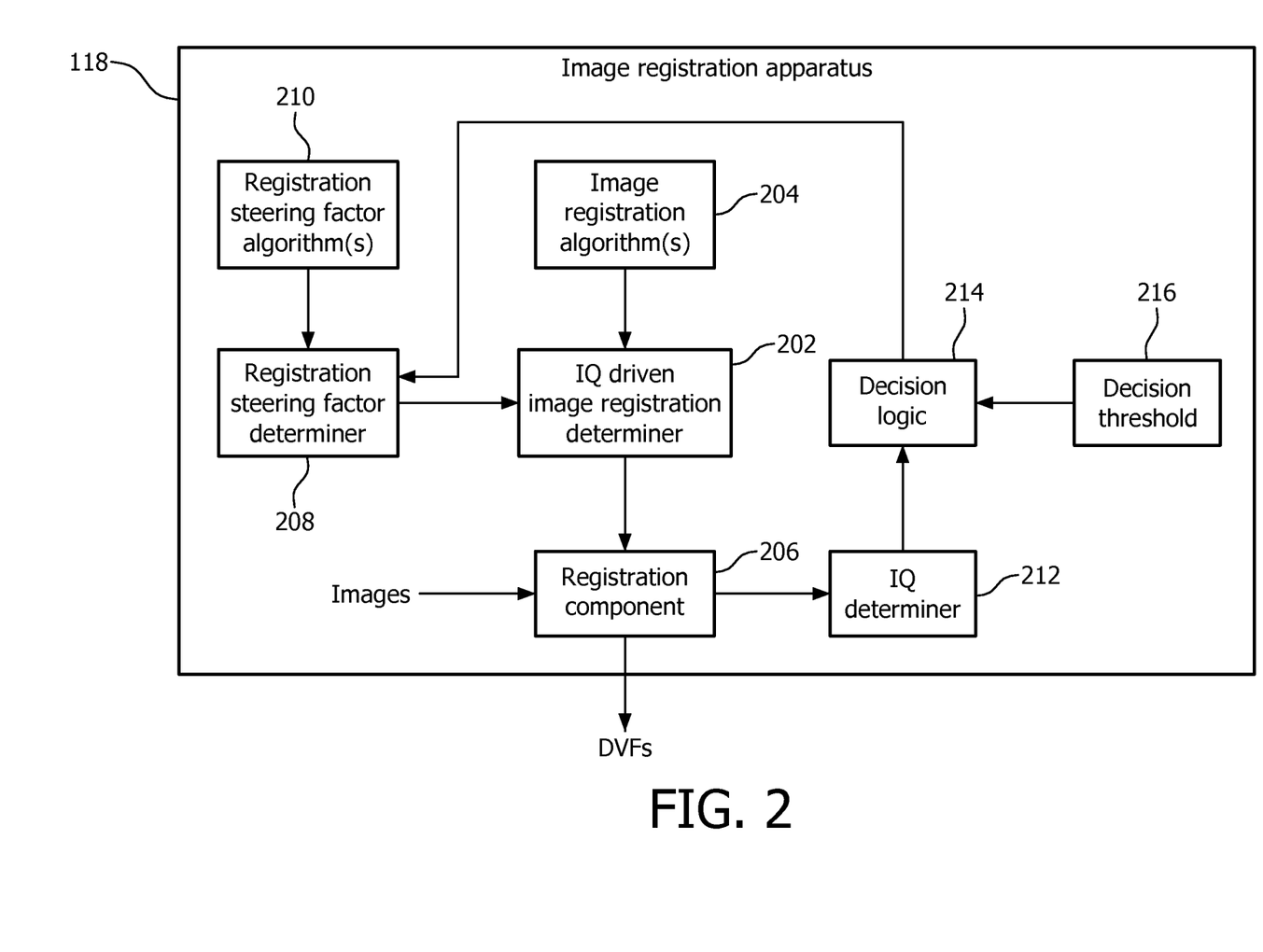
FIG. 2 illustrates an example of the image processing component.

FIG. 2 illustrates an example of the image registration apparatus 118.

In this example, the image registration apparatus 118 includes an image quality (IQ) driven image registration determiner 202 that combines an image registration algorithm 204 (which can be input and/or stored in memory) and a registration steering factor to generate an image quality (IQ) driven image registration. A registration component 206 employs the IQ driven image registration to register a set of input images. An example application is the registration of 4D images (i.e., 3D images acquired over time), for example, to assess regional volume changes for radiation therapy planning where it is important to identify well-functioning regions which can then be spared from radiation.

The image registration algorithm 204 includes a non-rigid registration that optimizes an objective function that includes an image similarity term and a regularization term. As discussed in connection with FIG. 1, the particular algorithm can be selected and/or changed by a user via the interactive GUI presented via the display 120. The image similarity term can be based on mutual information, sum of squared differences, intensity correlation, etc., and the regularization term, generally, ensures a predetermined degree of smoothness, by, for penalizing, penalizing first and/or second derivatives of the mapping field. The image similarity term and regularization term can be weighted, for example, depending on methodological choices, image modality, application, etc. The optimization can be based on an algorithm such as gradient descent, conjugate gradients, and/or other approach.

An example of such an algorithm is described in Kabus et al., Fast elastic image registration, In: Proc. of MICCAI Workshop: Medical Image Analysis For The Clinic—A Grand Challenge, (2010) 81-89. Generally, the algorithm described in Kabus et al. assumes a reference (or fixed) image R(x) and a template (or moving) image T(x). It finds an affine transformation p as well as a deformation vector field (DVF) u: $\mathbb{R}^3 \rightarrow \mathbb{R}^3$ such that the displaced template image $T_u(x):=T(\phi(p; x)+u(x))$ minimizes both a similarity measure D and a regularizing term S. Here, the mapping $\phi p; x)$ describes the transformation of voxel position x under an affine transformation given by the vector p.

A suitable similarity term D, using sum of squared differences, is shown in EQUATION 1:

$$D[u] := \frac{1}{2} \int_\Omega W_D(x)[R(x) - T_u(x)]^2 dx, \quad \text{EQUATION 1}$$

where $W_D(x)$ represents a weighting factor that may be dependent on x. Other similarity measures based on correlation, entropy, image derivatives etc. are also contemplated herein. A suitable regularizing term S, based on the Navier-Lame equation, is shown in EQUATION 2:

$$S[u] := \qquad\qquad \text{EQUATION 2}$$

$$\int_\Omega W_S(x) \left( \frac{\mu}{4} \sum_{i,j=1}^{3} (\partial_{x_j} u_i(x) + \partial_{x_i} u_j(x))^2 + \frac{\lambda}{2} (\nabla \cdot u(x))^2 \right) dx$$

where $W_S(x)$ represents a weighting factor that may be dependent on x, and the parameters $\lambda$ and $\mu$ (Navier-Lamáe parameters) describe the modeled material properties. They can be fixed or variable over the entire image. Regularizing terms based on other derivatives of u are possible as well.

A registration steering factor determiner 208 determines a registration steering factor RSF based on at least one registration steering factor algorithm 210. Suitable registration steering factor algorithms 210 include, but are not limited to, an imaging system image quality based algorithm and an image quality of a registered image based algorithm. Examples of these algorithms are described below. Other algorithms are also contemplated herein. As discussed in connection with FIG. 1, the particular algorithm and/or parameters thereof can be selected and/or changed by a user via the interactive GUI presented via the display 120.

The IQ driven image registration determiner 202 combines EQUATION 1 and the RSF term to render EQUATION 3, $$D[u] := \frac{1}{2} \int_\Omega RSF(W_D(x), x)[R(x) - T_u(x)]^2 dx, \qquad \text{EQUATION 3}$$

and EQUATIONS 2 and 3, generating an IQ driven image registration such as the IQ driven image registration of EQUATION 4:

$$OF = D[u] + S[u]. \qquad \text{EQUATION 4:}$$

In EQUATION 4, RSF is a function, for example, an identity mapping and the weights in $W_D$ steer the registration. In another instance, RSF is not an identity mapping, but transforms (linearly or non-linearly) $W_D$.

In one instance, the registration is formulated as minimizing the joint functional $$D[u] + S[u] \xrightarrow{u} \min.$$

Additional and/or different functionals can be added to the joint functional, for example, to incorporate constraints such as landmark positions or DVF-related properties. Based on calculus of variations, the joint functional is reformulated as a system of non-linear partial differential equations as shown in EQUATION 5:

$$\mu\Delta u + (\mu+\lambda)\nabla\cdot\nabla u = RSF\nabla T_u(R-T_u). \qquad \text{EQUATION 5:}$$

For discretizing EQUATION 5, finite differences in conjunction with Neumann boundary conditions can be used. The resulting system of linear equations consists of a sparse, symmetric and highly structured matrix arising from the regularizing term and a force vector corresponding to the similarity measure. The system of equations can then be linearized and iteratively solved by an optimization scheme, e.g. by a conjugate gradient and/or other scheme.

Generally, the RSF term allows for down (or up) weighting the contribution of the image similarity term D for different voxels or regions of voxels of the image. By way of example, where it is known that a particular region of voxels is associated with lower image quality, the RSF term can be set to less than one to down weight the image similarity term D, which would steer the registration towards the regularization term S.

Where a particular voxel or region of voxels is to be excluded, the RSF is set to zero (0). For another voxel or region of voxels, where a particular voxel or region of voxels is to be partially considered, the RSF is set to 0.0<RSF<1.0. For another voxel or region of voxels, where a particular voxel or region of voxels is to be fully considered, the RSF is set to one (1). Additionally or alternatively, the RSF term, a different determined RSF term and/or a RSF term derived from the RSF term (e.g., RSF'=1−RSF) can be applied to the regularization term. Other mappings for RSF are also contemplated herein. As discussed in connection with FIG. 1, the parameters affecting the value of RSF can be selected and/or changed by a user via the interactive GUI presented via the display 120.

As briefly discussed above, suitable registration steering factor algorithms 210 include, but are not limited to, an imaging system image quality based algorithm and/or a determined image quality of a registered image based algorithm.

By way of non-limiting example, with respect to the imaging system image quality based algorithm, the registration steering factor can be based on prior knowledge of the imaging system's image quality. Generally, where a particular region of an image is known to be less reliable or have lower image quality than another region of an image (i.e., there is local fidelity variation across a given image) in a known manner based on the imaging system, this information can be used by the registration steering factor determiner 208 to determine the registration steering factor.

For example, where the imaging system 100 is a cone beam CT scanner and the images are cone beam CT images, which, generally, have higher image quality near the axis of rotation and lower image quality (e.g., are more noisy) farther away from the axis of rotation, the registration steering factor can be generated to steer the registration towards the regularization term so that the image similarity term contributes to a lesser degree to noisier regions of the image relative to higher image quality regions. The steering transition between regions can be stepped or smooth, including linear and non-linear functions. Similarly, for MR acquisitions, regional coil sensitivity and/or magnetic susceptibility gradients could be used to define the steering factor.

With respect to the determined image quality of a registered image based algorithm, in one instance, physiological mechanics can be considered for physiology motivated registrations. A physiological mechanic based algorithm is well-suited for applications in which the registration captures physiological dynamics such as organ motion, where only a certain range of resulting mappings are physiologically plausible. In this case, registration fidelity can be used to determine the steering factor for a subsequent (e.g., second, third, etc. pass) registration.

Where the image registration apparatus 118 is configured to employ the image quality of a registered image based algorithm, an image quality (IQ) determiner 212 evaluates registered images and determines an image quality (IQ) metric indicative of the image quality of one or more of the registered images. An example of an approach to determine a suitable IQ metric is described in patent application Ser. No. 61/664,874, entitled "MOTION PARAMETER ESTIMATION," which is incorporated by reference herein.

In 61/664,874, deformation vector fields (DVFs) are determined between pairs of registered images of a set of 4D images, where each DVF includes a motion vector for each voxel indicative of how each voxel has moved from one image to the other image of the pair of images. Each pair of images can include, for example, a baseline or reference image from the 4D image set and another of the images from the 4D image set. The baseline or reference image can be a same or a different image for two or more of the other images.

In 61/664,874, volume curves are generated from the DVFs and a motion model corresponding to the motion of interest (e.g., respiratory, cardiac, general muscle, etc.) is fit to the volume curves. A confidence level is then generated based on the fit and is defined as shown in EQUATION 6:

$$E(x) := \frac{1}{\max(\alpha(x), \varepsilon)} \|V^{model}(x, t) - V(t)\|^2, \qquad \text{EQUATION 6}$$

where E(x) represents the error between the volume curve and the model for voxel x, α represents a motion amplitude, $V^{model}(\bullet)$ represents the fitted model, V(•) represents the Jacobian determinants of DVFs, and t represents time.

The IQ determiner 212 can employ E(x) and/or a variant thereof as a IQ metric. For example, where the model provides an accurate representation of a motion of a scanned object and the registered images include generally higher image quality regions, E(x) will be smaller for the individual voxels. However, where at least one of the registered images includes a region of lower image quality, E(x) will be larger for the lower image quality region. As such, E(x) can be used to identify voxels or regions of voxels of lower image quality.

Decision logic 214 compares E(x) with a predetermined decision threshold 216 and determines whether a subsequent (e.g., second, third, etc.) registration should be performed. Where it is determined that a subsequent registration should be performed (e.g., E(x)>decision threshold), E(x) is fed back to the registration steering factor determiner 208, which can then generate a RSF based on E(x), which is used by the IQ driven image registration determiner 202 to generate a fidelity driven registration, which is used by the registration component 206 to register the images based thereon. As noted in connection with FIG. 1, the image registration apparatus 118 may also present a notification and/or a recommendation recommending the subsequent registration. In this instance, the subsequent registration may be user initiated and/or automatic.

The decision logic 214 can visually present a result of the comparison (e.g., the registration, DVFS, the IQ metric, and/or other information) and/or a notification and/or recommendation as to whether a subsequent registration should be performed. In this instance, an input received via the GUI via the display 120 and/or input device of the image registration apparatus 118 and indicative of a user's desire for the subsequent registration either invokes the subsequent registration where there is a desired or ignores or discards the recommendation where there is not desire. Another input can set or change a value of the decision threshold 216. In another embodiment, the decision logic 214 is configured to automatically invoke a subsequent registration based on the decision threshold 216.

With respect to utilizing E(x) to determine a RSF for a subsequent registration, for a voxel or region of voxels having a larger E(x), RSF can be set to less than one (1), which would steer the registration towards the regularization term S. For a voxel or region of voxels having a smaller E(x), RSF can be set to one (1) such that the registration is not steered. For a voxel or region of voxels with a E(x) therebetween, RSF can be set to a value between zero (0) and one (1). By way of non-limiting example, the registration steering factor algorithm 210 may indicate that for E(x)<0.80 RSF=one (1), for E(x)>0.95 RSF=zero (0), and for 0.80≤E(x)≤0.95 RSF varies from zero (0) to one (1), either linearly or non-linearly. Of course, other mappings and/or transitions are contemplated herein.

Figure 3:
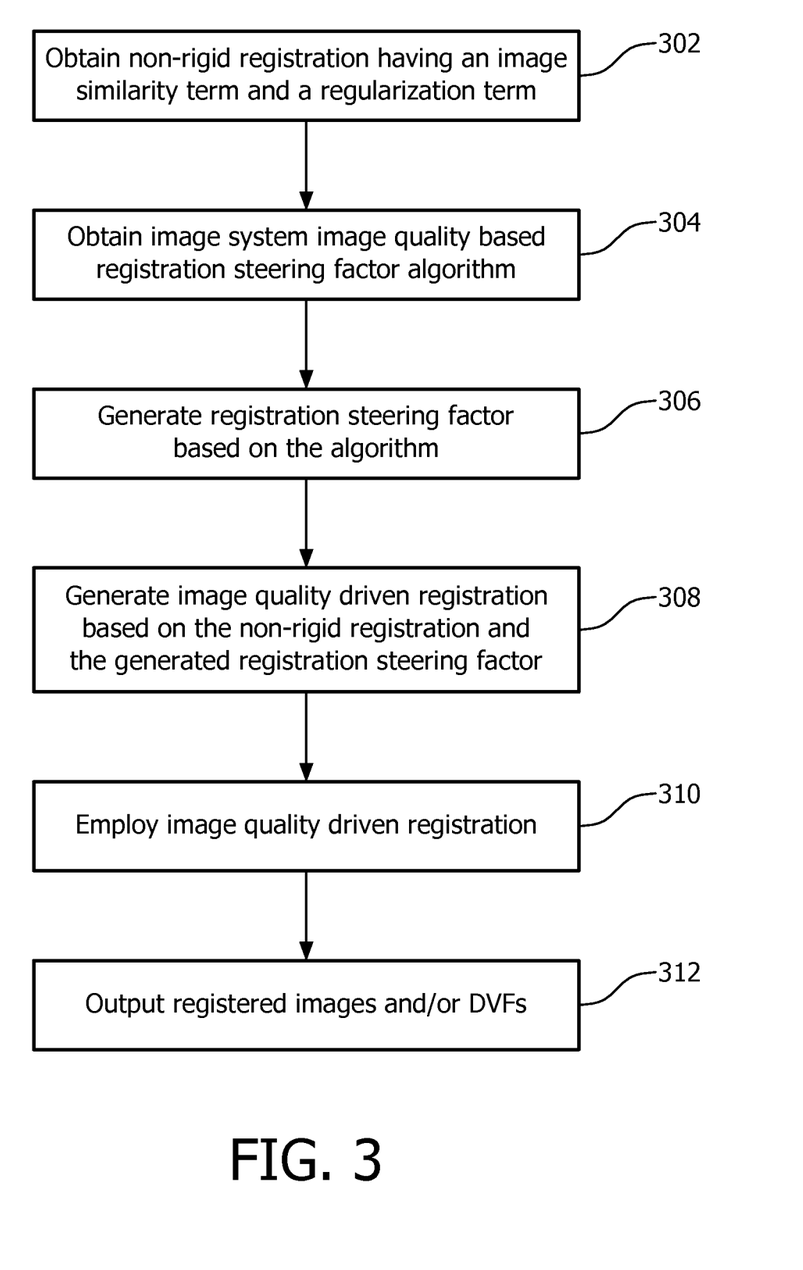
FIG. 3 illustrates an example method for determining a registration steering factor based on a known imaging system image quality.
Figure 4:
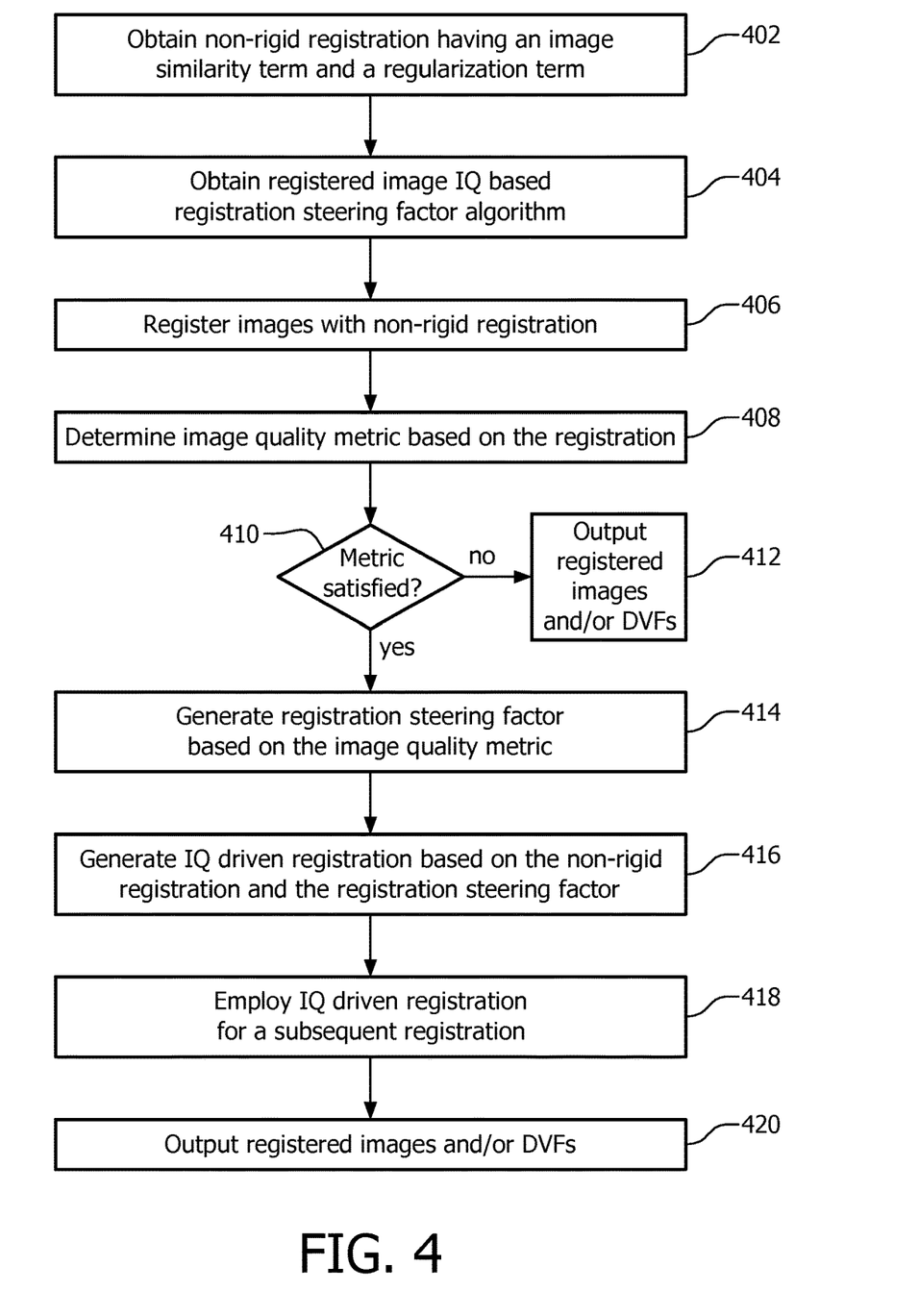
FIG. 4 illustrates an example method for determining a registration steering factor based on a determine image quality of a registered image.

FIGS. 3 and 4 illustrate example methods. It is to be appreciated that the ordering of the acts of these methods is not limiting. As such, other orderings are contemplated herein. In addition, one or more acts may be omitted and/or one or more additional acts may be included.

Initially referring to FIG. 3, an example method for determining a registration steering factor based on a known imaging system image quality is illustrated.

At 302, a non-rigid registration that includes an objective function having an image similarity term and a regularization term is obtained.

At 304, an imaging system image quality based registration steering factor algorithm is obtained.

At 306, a registration steering factor is generated based on the registration steering factor algorithm and knowledge about the imaging system image quality, including a known variability of image quality across the images generated thereby.

At 308, an image quality driven registration is generated based on the obtained non-rigid registration algorithm and the generated registration steering factor. As discussed herein, the registration steering factor steers the registration towards the regularization term based on a degree of image quality.

At 310, the image quality driven registration is used to register a set of input images.

At 312, at least one of the registered images or DVFS for the registered images are output.

Next at FIG. 4, an example method for determining a registration steering factor based on a determined image quality of a registered image is illustrated.

At 402, a non-rigid registration that includes an objective function having an image similarity term and a regularization term is obtained.

At 404, an image quality of a registered image based registration steering factor algorithm is obtained.

At 406, the non-rigid registration is used to register a set of input images.

At 408, an image quality metric is generated based on the registered images.

At 410, it is determined if the image quality metric satisfied based on a predetermined decision threshold.

At 412, if not, then the registered images and/or a mapping therebetween is output.

At 414, if so, then the image quality metric is used to determine a registration steering factor.

At 416, an image quality driven image registration is generated based on the obtained non-rigid registration and the registration steering factor.

At 418, the image quality driven image registration is used to register the set of input images via a subsequent pass registration.

At 420, at least one of the registered images or DVFS for the registered images are output.

In another embodiment, the method of FIGS. 3 and 4 are combined such that the registration is based on a first registration based on the known imaging system image quality and then again based on the image quality of the registered images (with or without the known imaging system image quality).

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A computing system, comprising:
an image quality determiner, implemented by a computer processor, that determines deformation vector fields for a set of images registered with a set of input images by a non-rigid registration algorithm, generates volume curves based on the deformation vector fields, fits motion models to the generated volume curves, and determines an error between the fitted models and the volume curves, wherein the non-rigid registration algorithm includes an optimization of an image similarity term and a regularization term, and the error is an image quality metric;
an image quality driven image registration determiner, implemented by the computer processor, that determines an image quality driven image registration algorithm for a subsequent registration of the set of input images based on the set of images registered with the non-rigid registration algorithm and a registration steering factor, which is based on the image quality metric; and
a registration component, implemented by the computer processor, that performs the subsequent registration of the set of input images by registering the set of input images using the determined image quality driven image registration algorithm.

2. The computing system of claim 1, further comprising:
a registration steering factor determiner, implemented by a computer processor, that determines the registration steering factor based on a known imaging system image quality, which varies across at least one image of the set of images, which are generated by an imaging system.

3. The computing system of claim 2, wherein the registration steering factor down weights the image similarity term for a voxel or voxel region of an image depending on the known imaging system image quality of the voxel or voxel region.

4. The computing system of claim 1, wherein the registration component registers the set of images using the non-rigid registration, and performs the subsequent registration based on a result of the registration of the set of images.

5. The computing system of claim 1, wherein the error is greater for a voxel region of an image with lower image quality and lower for a voxel region of the image with a higher image quality.

6. The computing system of claim 1, further comprising:
a decision logic, implemented by the computer processor, that invokes the subsequent registration in response to the image quality metric satisfying a predetermined decision threshold.

7. The computing system of claim 1, wherein the registration steering factor steers the image quality driven image registration towards the regularization term based on a degree of an image quality of at least one of the registered images, wherein the lower the image quality, the more the registration is steered towards the regularization term and the less the image similarity term contributes to the registration.

8. A method, comprising:
determining, with a computing system, an image quality metric by determining deformation vector fields for a set of images registered with a set of input images by a non-rigid registration algorithm, generating volume curves based on the deformation vector fields, fitting motion models to the generated volume curves, and determining an error between the fitted models and the volume curve, wherein the non-rigid registration algorithm includes an optimization of an image similarity and a regularization term, and the error is the image quality metric;
determining, with the computing system, an image quality driven image registration algorithm for subsequent registration of the set of input images based on the non-rigid registration algorithm and a registration steering factor that is based on the image quality metric; and
performing, with the computing system, the subsequent registration of the set of input images by registering the set of input images using the determined image quality driven image registration algorithm, generating a set of registered images.

9. The method of claim 8, wherein an image quality indicated by the image quality metric varies across at least one image of the set of images.

10. The method of claim 8, further comprising:
registering the set of images using the non-rigid registration to determine the deformation vector fields.

11. The method of claim 10, further comprising:
determining the registration steering factor based on the image quality metric.

12. The method of claim 8, wherein the registration steering factor steers the image quality driven image registration towards the regularization term based on a degree of an image quality of the registered images, wherein the lower the image quality, the more the registration is steered towards the regularization term and the less the image similarity term contributes to the registration.

13. The method of claim 8, further comprising:
receiving, via an interactive user interface, an input that determines the registration steering factor.

14. The method of claim 8, further comprising:
visually displaying, via an interactive user interface, the set of registered images.

15. The method of claim 14, wherein the registration steering factor locally decreases an image influence with respect to an increase of a regularization influence and increases, with respect to the decrease to an image influence, the regularization influence in an energy term optimized during the determining an image quality driven image registration algorithm in regions of lower image quality.

* * * * *